(12) United States Patent
Ishida

(10) Patent No.: US 7,964,047 B2
(45) Date of Patent: Jun. 21, 2011

(54) MANUFACTURING METHOD OF THREE-DIMENSIONAL STRUCTURE AND MANUFACTURING DEVICE THEREFOR

(75) Inventor: Masaya Ishida, Cambridge (GB)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 12/255,106

(22) Filed: Oct. 21, 2008

(65) Prior Publication Data

US 2009/0101271 A1 Apr. 23, 2009

(30) Foreign Application Priority Data

Oct. 23, 2007 (JP) .................................. 2007-274748

(51) Int. Cl.
| | |
|---|---|
| A63B 39/00 | (2006.01) |
| A63B 41/00 | (2006.01) |
| B29C 65/00 | (2006.01) |
| B29C 65/02 | (2006.01) |
| B32B 37/00 | (2006.01) |
| B32B 38/04 | (2006.01) |
| B32B 38/14 | (2006.01) |
| B32B 38/10 | (2006.01) |
| B32B 7/14 | (2006.01) |
| B31B 1/60 | (2006.01) |
| B44C 3/12 | (2006.01) |
| B44C 3/04 | (2006.01) |
| G03F 7/00 | (2006.01) |
| B65C 9/46 | (2006.01) |
| B31F 5/00 | (2006.01) |
| B31F 5/04 | (2006.01) |
| B30B 5/02 | (2006.01) |
| B30B 5/04 | (2006.01) |
| B30B 15/34 | (2006.01) |
| B27G 11/02 | (2006.01) |

(52) U.S. Cl. ............ 156/145; 156/146; 156/60; 156/63; 156/58; 156/59; 156/252; 156/277; 156/387; 156/510; 156/559; 156/250; 156/267; 156/291; 156/253; 156/516; 156/583.1; 156/257; 156/379.8; 156/538; 156/268; 156/379.6; 156/272.8

(58) Field of Classification Search .................. 156/145, 156/146, 60, 63, 58, 59, 252, 277, 387, 510, 156/559, 250, 267, 291, 253, 516, 583.1, 156/257, 379.8, 538, 268, 379.6, 272.8
See application file for complete search history.

(56) References Cited

U.S. PATENT DOCUMENTS 5,514,378 A * 5/1996 Mikos et al. .................. 424/425
(Continued)

FOREIGN PATENT DOCUMENTS

| JP | A-7-195533 | 8/1995 |
|---|---|---|
| JP | A-11-5255 | 1/1999 |

(Continued)

*Primary Examiner* — Khanh Nguyen
*Assistant Examiner* — Matthew Hoover
(74) *Attorney, Agent, or Firm* — Oliff & Berridge, PLC

(57) ABSTRACT

A manufacturing method of a three-dimensional structure includes (a) placing a second porous sheet on top of a first porous sheet that has a predetermined external shape and at least part of which contains a first functional liquid, (b) bonding at least a range surrounded by a predetermined shape of the second porous sheet onto the first porous sheet, (c) processing the second porous sheet in the predetermined shape, and (d) after step (b), causing a second functional liquid to be contained in at least part of the range of the second porous sheet so that the first functional liquid and the second functional liquid are brought into contact through the first porous sheet and the second porous sheet.

15 Claims, 2 Drawing Sheets

U.S. PATENT DOCUMENTS

| | | | |
|---|---|---|---|
| 6,056,843 A * | 5/2000 | Morita et al. | 156/250 |
| 6,401,002 B1 * | 6/2002 | Jang et al. | 700/119 |
| 6,413,360 B1 | 7/2002 | Morita et al. | |
| 2004/0089412 A1 * | 5/2004 | Topolkaraev | 156/250 |
| 2004/0138336 A1 * | 7/2004 | Bredt et al. | 523/160 |
| 2006/0225834 A1 * | 10/2006 | Medina et al. | 156/273.3 |

FOREIGN PATENT DOCUMENTS

| | | |
|---|---|---|
| JP | A-2002-012456 | 1/2002 |
| JP | A-2005-238789 | 9/2005 |
| JP | A-2006-334697 | 12/2006 |
| JP | A-2007-192970 | 8/2007 |
| WO | WO 2005/037529 A1 | 4/2005 |

* cited by examiner

MANUFACTURING METHOD OF THREE-DIMENSIONAL STRUCTURE AND MANUFACTURING DEVICE THEREFOR

The entire disclosure of Japanese Patent Application No.: 2007-274748, filed Oct. 23, 2007 is expressly incorporated by the reference herein.

BACKGROUND

1. Technical Field

Several aspects of the present invention relate to a manufacturing method of a three-dimensional structure and more particularly to a manufacturing method of a three-dimensional structure in which porous sheets are laminated, and a manufacturing device suitable for practicing the manufacturing method.

2. Related Art

A three-dimensional modeling method, which is also called "rapid prototyping", is technologies that have been developed so as to evaluate the design and confirm functions by actually manufacturing a designed structure as a three-dimensional object.

In the three-dimensional modeling method, a manufacturing approach called "layered manufacturing" is generally used in which three-dimensional CAD (computer aided design) data in a desired shape is sliced to produce thin plates and the plates are stacked, thereby manufacturing a three-dimensional structure.

Layered manufacturing is classified into stereolithography (modeling methods using a liquid resin that is cured by being irradiated with ultraviolet (UV) rays), selective laser sintering (modeling methods in which powder is spread in a layer and then is solidified by laser sintering or adding a binder), laminated object manufacturing (LOM) (modeling methods of repeating supply, bond and cut of a paper sheet), inkjet methods (modeling methods of applying a liquid material and layering the material to form a shape), extrusion methods (a nozzle edge from which a material is squirted is run in a manner of drawing a picture with a single stroke to form a layer) and the like.

Three-dimensional modeling methods in the related art are only technologies for manufacturing design samples, and therefore photocurable materials, powder materials, paper sheets or the like are mainly used in the methods.

Although metal, ceramic and other materials are used in some of the methods, the realities are that there is little discussion on the functionality of materials for three-dimensional structures.

In contrast, an approach called "rapid manufacturing" is proposed that uses three-dimensional objects manufactured directly as articles of practical use.

A concept of manufacturing three-dimensional structures by using functional materials is thus being implemented.

However, manufacturing three-dimensional structures by using various desired materials is considered to be difficult with the existing three-dimensional modeling methods.

Among three-dimensional modeling methods of the related art, methods of using a laser for formation have restriction on materials, such as using a photocurable resin or sintering fine particles of metal and ceramics by a laser.

In selective laser sintering, part of a layer formed of powder is solidified with an adhesive serving as a binder, and therefore there is also restriction that the material needs to be a mixture of powder and a binder.

LOM uses paper sheets in the current conditions and is placed as a tool for reproducing a designed three-dimensional shape.

The material for use in this method is limited to paper or some of polymer materials.

On the other hand, inkjet methods and extrusion methods are said to have possibilities of selecting the liquid material among wide-ranging, various materials.

By way of example, structures can be manufactured by using metal fine particles for forming metal three-dimensional structures and sol liquids for forming ceramics.

However, when articles of practical use are produced by using functional materials by a three-dimensional modeling method, their formation time is a very important factor.

In particular, extrusion methods generally supply materials from one nozzle, and therefore has a drawback in that it takes a very long formation time for a three-dimensional structure.

Further, extrusion methods supply materials with relatively high viscosity from the nozzle.

Therefore, the real situation is that some materials such as polymeric material and sol liquids can be formed but the scope of material selection is not so broad.

In contrast, regarding inkjet methods, the liquid materials that can be discharged are limited to ones with relatively low viscosity, but their discharge speeds are relatively fast, several KHz, and a large number of nozzles can be used for drawing.

Accordingly, inkjet methods have advantages in formation time over extrusion methods.

However, there are few inkjet materials such as UV curable resins that have low viscosity during discharge and remain as solids after being cured.

An inkjet material from which the solvent evaporates and in which the solid content is left is of the general type.

To reduce the viscosity during inkjet discharge, the solid concentration is suppressed to be low, about 10%.

The film thickness that can be formed by one drawing therefore becomes thin.

This thin film thickness results in a drawback in that the formation time of a three-dimensional structure becomes long.

Moreover, it is difficult to freely form an overhanging shape and the like because the ink has low viscosity.

As a solution to the drawbacks, a method is proposed that forms the targeted pattern of an ink material in a desired shape by simultaneously patterning, using an inkjet method, the material together with a support member that can be removed after the formation.

However, there still remain a drawback and a problem.

The drawback is that two kinds of ink, i.e., ink for forming a three-dimensional structure and ink for support member need to be applied and therefore the formation time of a structure becomes long because of replacement of ink heads.

The problem is that two kinds of ink, solvents and the like are to be selected so that mixture of the two kinds of ink is avoided and only the support member can be easily removed.

Also, during the control in a desired shape, after an inkjet droplet has been once dried and solidified, the next inkjet droplet needs to be supplied.

It is difficult to supply inkjet droplets one after another.

Thus, there is a problem that actual formation process speeds considerably decrease due to such processes of dry and solidification, As one application of three-dimensional modeling methods, manufacturing scaffolds for artificial organs attract expectations.

Practical implementation of artificial culture of cell tissues of bones and skins has already started.

In the future, developments into practical implementation of artificial culture of organs that require more complex microstructures are anticipated.

To realize an artificial organ of heart, liver, kidney or the like, a platform (model) structure called a "scaffold" is formed of a biocompatible material, biological materials (biological factors) such as various cells and growth factors are supplied into the structure, and cells are cultured in a culture solution.

The material for a scaffold is preferably a biodegradable material.

It is preferable that the scaffold material be gradually decomposed with the growth of cell tissues and eventually all the material be replaced by the cell tissues.

To realize an artificial organ of heart, liver, kidney or the like, microstructures need to be formed in a scaffold.

First, the scaffold needs to be porous in order for cell tissues and the like to grow, and its porosity is preferably 80% or more.

It is preferable that such microstructures (micro-compartment) be formed such that the pitch is on the order of about 100 to 200 microns.

Further, microstructures having a little larger size than the above are needed.

In the case of liver as a special example, tubular structures on the order of millimeters or submillimeters for transporting bile generated in an artificial liver to the digestive system need to be spread in the organ.

As described above, to actualize a scaffold for an artificial organ, technologies are needed that can form microstructures in an arbitrary pattern and can manufacture a three-dimensional structure in an arbitrary shape by using a material being porous and biodegradable.

Not rapid prototyping that copies only a three-dimensional shape but three-dimensional structure manufacturing that also has vital functions on a high level, that is, rapid manufacturing technologies are desired to be realized.

Further, preferably, technical developments are expected to realize manufacturing of a scaffold being a model of an artificial organ for a relatively short time.

SUMMARY

The present invention can solve at least one of the foregoing problems, and can be implemented as follows.

According to a first aspect of the inventions a manufacturing method of a three-dimensional structure includes (a) placing a second porous sheet on top of a first porous sheet that has a predetermined external shape and at least part of which contains a first functional liquid, (b) bonding at least a range surrounded by a predetermined shape of the second porous sheet onto the first porous sheet, (c) processing the second porous sheet in the predetermined shape, and (d) after step (b), causing a second functional liquid to be contained in at least part of the range of the second porous sheet so that the first functional liquid and the second functional liquid are brought into contact through the first porous sheet and the second porous sheet.

With this method, porous sheets are piled up as the basic skeleton of a three-dimensional structure, and therefore the three-dimensional structure can be formed of a material contained in a functional liquid for a relatively short time.

In the manufacturing method according to the first aspect, step (d) may include arranging the second functional liquid in the at least part of the range using an inkjet method.

With this method, materials of a wide range of types such as metal, ceramic and polymeric materials and biological materials can be supplied as a material different from a basic skeleton material (first and/or second porous sheet), enabling various functions to be imparted to a three-dimensional structure.

In the manufacturing method according to the first aspect, each of the first porous sheet and the second porous sheet may be made of a polymeric material.

With this method, use of a polymeric material excellent in mechanical characteristics enables actualization of a three-dimensional structure that, in spite of being porous, satisfies the mechanical strength.

In the manufacturing method according to the first aspect, each of the first porous sheet and the second porous sheet may be made of a biocompatible material.

In the manufacturing method according to the first aspect, each of the first porous sheet and the second porous sheet may be made of a biodegradable material.

In the manufacturing method according to the first aspect, each of the first porous sheet and the second porous sheet may be made of any one of polylactic acid, polyglycolic acid, a mixture thereof, a copolymer of thereof and hydrogel.

In the manufacturing method according to the first aspect, each of the first porous sheet and the second porous sheet may be made of any one of collagen, fibrin and hydroxyapatite.

The manufacturing method mentioned above enables actualization of structures for biological applications, and particularly of three-dimensional structures using preferable materials as scaffolds for artificial organs.

In the manufacturing method according to the first aspect, each of the first porous sheet and the second porous sheet may have a porosity of 50% or more.

This enables the main portion of a three-dimensional structure to be made of a material different from that of the basic skeleton, enabling a new function to appear.

In the manufacturing method according to the first aspect, each of the first porous sheet and the second porous sheet may have a porosity of 80% or more.

This makes it possible to manufacture three-dimensional structures that satisfy the porosity required as that of a scaffold for an artificial organ.

In the manufacturing method according to the first aspect, each of the first porous sheet and the second porous sheet may have a film thickness of 50 microns or more.

This enables the total number of layers to be restricted by increasing the film thickness per layer to some extent, enabling the formation time of a three-dimensional structure to be reduced.

In the manufacturing method according to the first aspect, each of the first porous sheet and the second porous sheet may have a film thickness of 100 microns or more and 500 microns or less.

If the thickness of a sheet is large, 500 microns or more, the sheet is hard to handle.

In addition, when a different material from the sheet material is applied into the basic skeleton of a structure by an inkjet method or the like to develop functionalities, the performance of applying of the different material becomes insufficient because the film thickness per layer is excessively thick.

In particular, when cells and the like are supplied into a biological scaffold, it is preferable from the viewpoint of cell growth that the thickness of a sheet be 500 microns or more.

In the manufacturing method according to the first aspect, the aforementioned step (d) may include performing surface treatment on a surface of the second porous sheet before arranging the second functional liquid using the inkjet method.

Control of the surface state of the porous sheet enables control of a process of forming of a material to be imparted later, the material being different from that of a porous sheet.

Specifically, by making the surface lyophobic by plasma treatment in a gas containing fluorine or by making the surface lyophilic by UV irradiation in the air, arrangement of materials by an inkjet method can be finely adjusted.

In the manufacturing method according to the first aspect, the foregoing step (d) may include one of plasma processing and ultraviolet irradiation as the surface treatment.

In the manufacturing method according to the first aspect, the aforementioned step (b) may include arranging an adhesive on at least one of a surface of the first porous sheet and a surface of the second porous sheet.

In the manufacturing method according to the first aspect, the foregoing step (b) may include arranging the adhesive on the at least one of the surfaces by an inkjet method.

With this method, an adhesive can be arranged only in required places, enabling adhesive usage to be reduced.

According to a second aspect of the invention, a manufacturing device of a three-dimensional structure includes a first mechanism for placing a second porous sheet on top of a first porous sheet that has a predetermined external shape and at least part of which contains a first functional liquid, a second mechanism for bonding at least a range surrounded by a predetermined shape of the second porous sheet onto the first porous sheet, a third mechanism for processing the second porous sheet in the predetermined shape, and a fourth mechanism for causing a second functional liquid to be contained in at least part of the range of the second porous sheet bonded.

In the manufacturing device according to the second aspect, the fourth mechanism may include an inkjet device for arranging the second functional liquid in the at least part of the range on the second porous sheet.

In the manufacturing device according to the second aspect, the third mechanism may have a laser device for applying a laser beam to the second porous sheet so as to cut or separate a portion other than the range from the second porous sheet.

This enables not only the porous sheet to be cut (separated) in a shape of an effective region but also a desired microstructure pattern to be formed in the porous sheet.

Specifically, a though-hole can be opened in the vertical direction in the sheet.

This enables a microstructure of the millimeter order needed for artificial organs and the like to be formed.

In the manufacturing device according to the second aspect, the third mechanism may have a mechanical cutter for cutting or separating a portion other than the range from the second porous sheet.

With the laser device mentioned above or this mechanical cutter, the porous sheet can be easily cut (separated), enabling the total formation time of a three-dimensional structure to be reduced.

The manufacturing device of the three-dimensional structure according to the second aspect further includes a plasma processor for performing surface treatment on a surface of the second porous sheet.

The manufacturing device of the three-dimensional structure according to the second aspect further includes an UV irradiator for performing surface treatment on a surface of the second porous sheet.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment of the invention will now be described using examples.

Example 1

Figure 1:
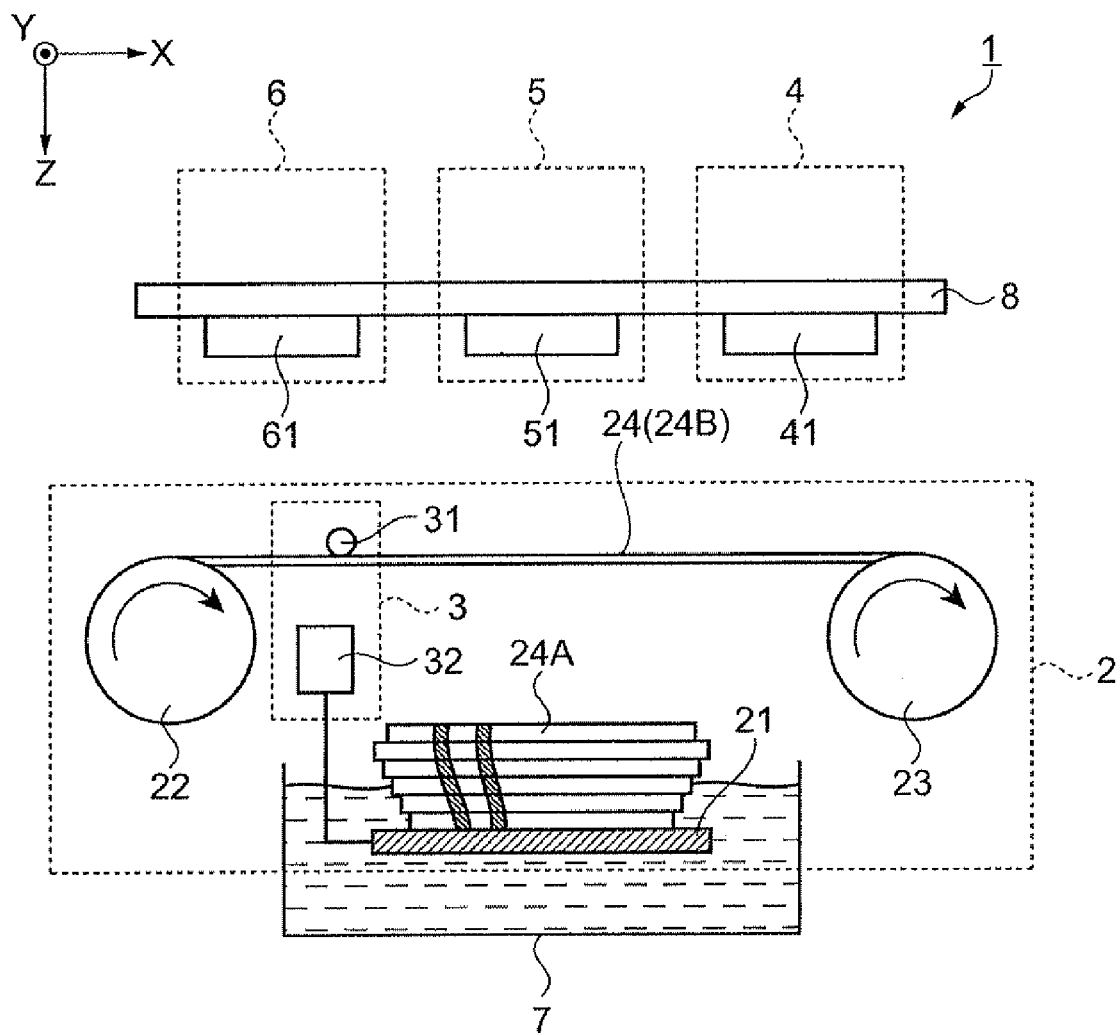
FIG. 1 is a schematic view of a manufacturing device of a three-dimensional structure of examples 1 and 2.

FIG. 1 is a schematic view of a manufacturing device of a three-dimensional structure of this example.

A manufacturing device 1 basically includes a sheet supply mechanism 2, a sheet bonding mechanism 3, a sheet processing mechanism 4, a functional liquid imparting mechanism 5, a surface treatment mechanism 6 and a container 7.

The sheet supply mechanism 2 is configured so as to place a porous sheet 24B on top of a porous sheet 24A.

Note that the porous sheet 24A used herein has a predetermined external shape and has at least part thereof containing functional liquids 9 and 10 (FIGS. 2A to 2E).

Specifically, the sheet supply mechanism 2 of this example includes a support table 21, a supply roll 22 and a collection roll 23.

One continuous porous mother sheet 24 is wound on the supply roll 22.

The supply roll 22 supplies the wound porous mother sheet 24 to a side of the collection roll 23.

The collection roll 23 collects the porous mother sheet 24 by winding the porous mother sheet 24 thereon.

On the other hand, the support table 21 is positioned to fit with a path along which the porous mother sheet 24 moves between the supply roll 22 and the collection roll 23.

On this support table 21, the porous sheets 24A and 24B are to be laminated.

The porous sheets 24A and 24B used herein constitute part of the porous mother sheet 24, or portions separated from the porous mother sheet 24.

The sheet bonding mechanism 3 is configured so as to bond at least a range surrounded by a predetermined shape of the porous sheet 24B onto the porous sheet 24A.

Specifically, the sheet bonding mechanism 3 in the example includes a bonding roller 31 and a lift 32.

Here, the bonding roller 31 is configured to heat the porous mother sheet 24 (i.e., the porous sheet 24B) supplied from the supply roll 22.

Heating by the bonding roller 31 fuses an adhesive layer coating the whole of one surface (or back surface) of the porous mother sheet 24.

On the other hand, while the adhesive layer is being fused, the lift 32 lifts the support table 21 on a side of the porous sheet 24B so that the top sheet (i.e., the porous sheet 24A) of one or more sheets laminated on the support table 21 comes in contact with the adhesive layer of the porous mother sheet 24 (i.e., the porous sheet 24B).

In this way, the sheet bonding mechanism 3 bonds the porous sheet 24B onto the porous sheet 24A in this example.

The sheet processing mechanism 4 is configured to process the bonded porous sheet 24B in the aforementioned predetermined shape.

Specifically, the sheet processing mechanism 4 in this example has a three-axis actuator 8 and a laser device (not shown) for sheet cutting (separating).

The laser device for sheet cutting (separating) has a beam generator (not shown) for generating laser beams, and a mirror group 41.

Laser beams generated by the beam generator have enough energy to cut or separate the porous sheet 24B.

On the other hand, the mirror group 41 includes a plurality of mirrors.

The orientation of part of the plurality of mirrors is variable in accordance with the motion of the three-axis actuator 8.

The mirror group 41 is configured to guide laser beams from the beam generator to a portion in accordance with the position of the three-axis actuator 8 on the porous sheet 24B.

The functional liquid imparting mechanism 5 has a function of causing the functional liquids 9 and 10 to be contained in at least part of the aforementioned range of the bonded porous sheet 24B.

Specifically, the functional liquid imparting mechanism 5 in this example includes the foregoing three-axis actuator 8 and an inkjet device 51 fixed onto the three-axis actuator 8.

In this example, the three-axis actuator 8 is common to the sheet processing mechanism 4 and the functional liquid imparting mechanism 5.

However, the sheet processing mechanism 4 and the functional liquid imparting mechanism 5 may include separate three-axis actuators 8.

The inkjet device 51 has inkjet heads (not shown) for discharging the functional liquids 9 and 10.

This inkjet head is two-dimensionally relatively movable with respect to the porous sheet 24B at least in a plane parallel to the surface of the porous sheet 24B.

With such a configuration, the inkjet device 51 arranges the functional liquids 9 and 10 in arbitrary portions of the porous sheet 24B.

The surface treatment mechanism 6 includes a surface treatment device 61 configured to perform surface treatment on the surface of the porous sheet 24B.

Specifically, the surface treatment device 61 in this example is a device (or a plasma irradiator) for irradiation of the surface of the porous mother sheet 24 (or the porous sheet 24B) with plasma under atmospheric pressure.

Note that the surface treatment device 61 may be a device (or a UV irradiator) for irradiation of the foregoing surface with UV rays in other examples.

The container 7 is below the support table 21 and stores a physiological saline solution (or a culture solution).

When the support table 21 is moved to the opposite side to the porous mother sheet 24 by the lift 32, the porous sheets 24A and 24B laminated on the support table 21 are immersed together with the support table 21 into the physiological saline solution in the container 7.

With reference to FIGS. 2A to 2E, a manufacturing method of a three-dimensional structure of this example will be described.

It is preferable in terms of efficiency that the manufacturing method of a three-dimensional structure of this example be implemented using the foregoing manufacturing device 1.

However, the manufacturing device 1 is not indispensable for implementation of the manufacturing method of this example.

Figure 2A:
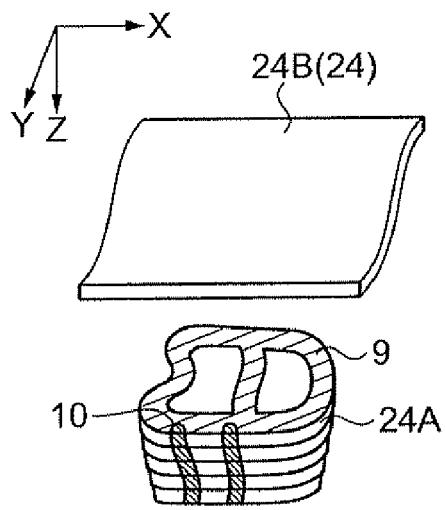
FIGS. 2A to 2E show a manufacturing method of the three-dimensional structure of examples 1 and 2.

First, as shown in FIG. 2A, the porous sheet 24B is placed on top of the porous sheet 24A that has a predetermined external shape and at least part of which contains the functional liquids 9 and 10.

In this examples the functional liquid 9 contained in the porous sheet 24A constitutes one region on the porous sheet 24A.

On the one hand, the functional liquid 10 contained in the porous sheet 24A constitutes two regions on the porous sheet 24A.

On the other hand, the porous sheet 24B at this stage is part of the porous mother sheet 24.

Here, the porous mother sheet 24 has a porous structure.

Due to the porous structure, when the functional liquid 9 (10) is arranged in an arbitrary portion of the porous mother sheet 24, the portion absorbs or holds the functional liquid 9 (10).

As a result, the portion contains the functional liquid 9 (10).

Figure 2B:
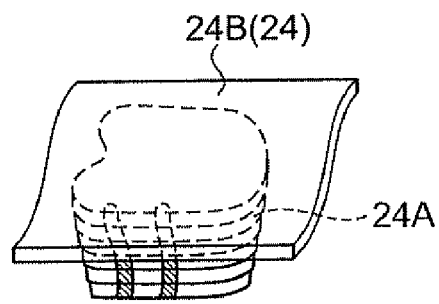

Next, as shown in FIG. 2B, at least a range surrounded by a predetermined shape is bonded onto the porous sheet 24A.

Figure 2C:
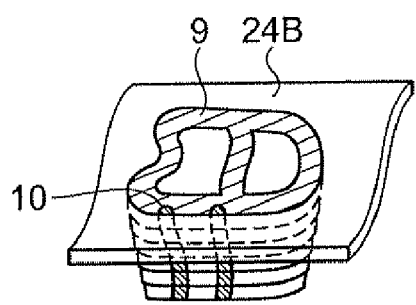

Next, as shown in FIG. 2C, the functional liquids 9 and 10 are contained in at least part of the aforementioned range of the porous sheet 24B so that the functional liquids 9 or the second functional liquids 10 are brought into contact through the porous sheet 24A and the second porous sheet 24B.

Specifically, in this example, the functional liquids 9 and 10 are placed in the porous sheet 24B by an inkjet method so that one region of the functional liquid 9 and two regions of the functional liquid 10 are obtained in the range of the porous sheet 24B.

Since the porous sheet 24B has a porous structure, the placed functional liquids 9 and 10 are absorbed or held by the porous sheet 24B and, as a result, are contained in the porous sheet 24B.

Here, the functional liquid 9 (10) to be contained in the porous sheet 24A may be referred to as a "first functional liquid", and the functional liquid 9 (10) to be contained in the porous sheet 24B as a "second functional liquid".

In this example, the "first functional liquid" and the "second functional liquid" are the same liquid.

Figure 2D:
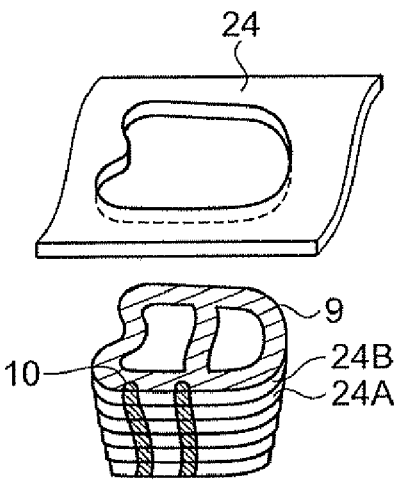

In other examples, however, the "first functional liquid" and the "second functional liquid" may be different from each other, Further, as shown in FIG. 2D, the porous sheet 24B is processed in the foregoing predetermined shape.

Specifically, in this example, a range surrounded in the predetermined shape of the porous sheet 24B is separated from the rest of the porous sheet 24B using laser beams (i.e., laser light).

The predetermined shape used here corresponds to the external shape of one of a plurality of slices when a targeted three-dimensional structure such as an organ is divided into the plurality of slices.

Note that both the placement of the functional liquids 9 and 10 in the porous sheet 24B and the processing (separation) of the porous sheet 24B are performed after bonding of the porous sheet 24B.

However, the placement of the functional liquids 9 and 10 in the porous sheet 24B may be performed either before or after the processing (separation) of the porous sheet 24B.

In this example, the one region of the functional liquid 9 contained in the porous sheet 24A and the one region of the functional liquid 9 contained in the porous sheet 24B are brought into contact with each other while their respective liquid states being maintained.

Likewise, the two regions of the functional liquid 10 contained in the porous sheet 24A and the two regions of the functional liquid 10 contained in the porous sheet 24B are brought into contact while their respective liquid states being maintained.

In other words, in this example, functional liquids that are identical to each other are brought into contact with each other through the porous sheet 24A and the porous sheet 24B.

In other examples, however, functional liquids that are different from each other may be brought into contact through the porous sheet 24A and the porous sheet 24B.

Each of the porous sheets 24A and 24B has a porous structure.

Each of the porous sheets 24A and 24B therefore absorbs and holds the functional liquid 9 in a portion where the functional liquid 9 has been placed.

Accordingly, laminating of the porous sheet 24A and the porous sheet 24B allows the region of the functional liquid 9 in the porous sheet 24A and the region of the functional liquid 9 in the porous sheet 24B to be connected with each other to extend in the z-axis direction.

The shape of the region of the functional liquid 9 in each of the porous sheets 24A and 24B can be arbitrarily designed by an inkjet method.

Because of this, the final three-dimensional shape of the region of the functional liquid 9 can also be arbitrarily designed.

For example, an overhanging shape can be easily formed along the z-axis direction of the functional liquid 9.

The region of the functional liquid 10 can be arbitrarily designed just as the region of the functional liquid 9.

Here, the z-axis direction in this example is a direction in which the porous sheets 24A and 24B are laminated.

In this example, at least in a range where the porous mother sheet 24 and the support table 21 overlap, the porous mother sheet 24 is positioned on a virtual plane (xy-plane) substantially perpendicular to the z-axis direction.

Figure 2E:
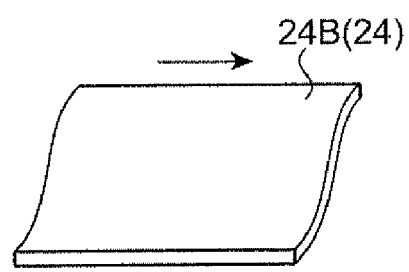

Next, as shown in FIG. 2E, the porous mother sheet 24 is moved, so that a new portion of the porous mother sheet 24 is supplied on the porous sheet 24B containing the functional liquids 9 and 10.

At this stage, using the term "porous sheet 24A" to replace this porous sheet 24B and using the term "porous sheet 24B" to designate the supplied new portion, processes from FIG. 2B to FIG. 2E are repeated.

The processes are repeated until a targeted three-dimensional structure has been obtained.

By the manufacturing method of this example, the regions of the functional liquid 9 are structurized.

Specifically, the regions of the functional liquid 9 are three-dimensionally connected.

In addition, if the functional liquid 9 contains biological factors such as biological cells, the organic functions of the biological factors can also be three dimensionally connected.

The same description as the foregoing description regarding the regions of the functional liquid 9 is applied to the regions of the functional liquid 10.

In this example, the final regions of the functional liquid 9 and the functional liquid 10 are collectively referred to as a three-dimensional structure.

However, the three-dimensional structure may be composed of one or more regions of one functional liquid, and may also be composed of a plurality of regions of three or more functional liquids.

The foregoing manufacturing device 1 and the manufacturing method will be described in more detail below.

As shown in FIG. 1, a plurality of porous sheets 24A and 24B are sequentially laminated with adhesive layers interposed therebetween on the support table 21, and are processed in a desired shape, thereby forming a three-dimensional structure.

In this example, the plurality of porous sheets 24A are continuously supplied from the porous mother sheet 24 wound around the supply roll 22, and only the effective region of the porous mother sheet 24 is sequentially processed/laminated whereas the non-effective region is wound on the collection roll 23.

Although the plurality of porous sheets 24A are obtained from the porous mother sheet 24 utilizing a reel-to-reel method in this example, the invention is not limited to this example with such a method.

A method of supplying and collecting a plurality of porous sheets 24A, each being cut (separated) beforehand, in a batch manner and the like may be used.

The mirror portion of the laser device for sheet cutting (separating), the inkjet device 51 and the surface treatment device 61 are each fixed onto the three-axis actuator 8.

Assuming that the direction of the proceed of the porous mother sheet 24 is an x axis, the direction perpendicular to the x axis in a sheet plane is a y axis, and the direction perpendicular to the sheet plane is a z axis, three stages are combined so that part of the mirror group 41 of the laser device for sheet cutting (separating), the inkjet device 51 and the surface treatment device 61 are movable in the x-axis, y-axis and z-axis directions, thus constituting the three-axis actuator 8.

These are computer-controlled in conjunction with supplying of the porous mother sheet 24 (or the porous sheet 24B), laminating of the porous sheet 24A and the porous sheet 24B, and the like (not shown).

A carbon dioxide gas laser is used for the laser device for sheet cutting (separating), the main body of the laser is fixed, instead of being arranged on the three-axis actuator 8, and a light converging optical system, especially a mirror, is mounted on the three-axis actuator 8.

In this way, arrangement is made so that the effective region and the non-effective region can be cut (separated) in a range of the porous mother sheet 24 (or the porous sheet 24B).

The inkjet device 51 is in an on-demand system, and has two inkjet heads of a type of having two rows of 180 nozzles mounted thereon.

The control system of the inkjet device 51 is thus built so that different ink materials (or functional liquids), four kinds in total, containing the functional liquids 9 and 10 can be applied in accordance with a desired pattern from each nozzle row.

A device that enables plasma irradiation under atmospheric pressure is used as the surface treatment device 61.

The purpose of using this device is that a porous sheet that has been manufactured in advance is subjected to surface treatment immediately before the inkjet process, resulting in formation of a uniform, stable inkjet film.

It is needless to say that the same effect is obtained by UV irradiation.

Further, in plasma treatment, if a gas chamber is provided as an annex, uniformity and stability can be ensured even in plasma treatment in various gases.

Next, description will be given on the porous sheets 24A and 24B.

In this example, manufacturing a scaffold for an artificial organ will be described in detail.

Regarding a porous sheet material, it preferably has biocompatibility as well as biodegradability.

As candidates for such a material, PLA (polylactic acid), PGA (polyglycolic acid) and PLGA (poly(lactic-co-glycolic acid)) are mentioned among synthetic materials, and collagen, fibrin and hydroxyapatite are mentioned among biomaterials.

Biodegradable plastics are attracting great attention as a solution to the recent environmental issue caused by wastes, and various kinds of biodegradable materials are relatively easily available.

PLA widely used in general practice was used in this example.

As a manufacturing method of a porous plastic film or sheet, various manufacturing methods have been devised, such as a method to freeze-dry a polymer solution being the raw material, a method to remove only the phase other than the raw material by dissolution after forming a two-component thin film containing the raw material, and a method to cause a volatile compound to be absorbed in the raw material beforehand and foam the volatile compound later.

In this example, a foamed sheet having a porosity of 85% was formed by using isobutane as the volatile compound by a general extrusion method.

At this point, a porous sheet was adjusted to have a film thickness of 200 microns.

The size of a microstructure (micro-compartment) was a little below 80 microns, but it was confirmed that the size was able to be changed by sheet formation conditions.

In this example, a technique of manufacturing a hole by using a volatile component was used.

However, it is needless to say that the invention is not limited to this and is also effective in other porous sheet manufacturing methods.

Next, description will be given on laminating of the porous sheets 24A and 24B.

Regarding an adhesive material, a material having biocompatibility as well as biodegradability is preferable just as the material of the porous sheets 24A and 24B.

In this example, PLA was used as the adhesive material.

Specifically, using an aqueous emulsion of PLA having a particle size of one micron or less, the aqueous emulsion is applied onto the surface of the porous sheet 24A that has already been cut in a shape of the effective region and, on top of that, the next porous sheet is laminated.

In order to obtain a desired peel strength for the both porous sheets, heating at a minimum temperature of about 60 to 70° C. is required.

In manufacturing a scaffold for an artificial organ, it is necessary to impart biological factors of biological cells and the like to a porous film before laminating porous sheets.

However, biological factors are very vulnerable to heat damage, and therefore heating needs to be performed carefully.

Some contrivances are needed.

For example, the porous sheet 24B to be laminated is heated beforehand to a desired temperature, and an adhesive is applied onto the surface of the porous sheet 24B cut into a shape of the effective region so as to make it faster for the porous sheet 24B to be bonded.

Alternatively, the bonding roller 31 is heated to a desired temperature, and then the porous sheets 24A and 24B are pressed with the heated roller 31 only for a short time.

For an applying method of an aqueous emulsion of PLA being the adhesive, an inkjet method, overall coating using an anilox roll and the like, partial coating by a flexographic printing method, and the like may be used.

In the case of an inkjet method, the solid concentration needs to be 10% or less, and the viscosity needs to be about 10 mPa·s or less.

On the other hand, in the case of coating using an anilox roll and a resin plate, coating with an increased solid concentration is desirable.

As described above, laminating of the porous sheets 24A and 24B made of a biodegradable material was repeated, mutual porous sheets 24A and 24B were bonded together with an adhesive having biodegradability, and further the bonded porous sheets 24A and 24B were cut (separated) into a desired shape.

Thus, a three-dimensional structure that functions as a scaffold for an artificial organ was able to be manufactured for a relatively short time.

Example 2

Next, the invention will be described using another example.

Description will be given on a case where a three-dimensional structure is manufactured with its color tone exactly according to the design.

The used manufacturing device of a three-dimensional structure is substantially the same as in the example 1.

However, as the functional liquid discharged from an inkjet head of the inkjet device 51, two kinds of liquids, titania fine particle ink (fine particle size of about 0.2 microns, aqueous solution, titania concentration of 4%) and carbon black ink (fine particle size of about 0.05 microns, aqueous solution, carbon black concentration of 4.5%), were newly added.

These liquids are ones for coloring the surface of a three-dimensional structure white and black, respectively.

The porous mother sheet 24 having a thickness of 100 microns, a porosity of 90% and a size of a microstructure (micro-compartment) of about 40 microns was used.

Regarding a sheet material, PLA was used just as in example 1.

When a three-dimensional structure was formed in the same way as in example 1, coloring the whole surfaces of the uppermost layer and the lowermost layer and portions on the effective region side of the boundary of the effective region of intermediate porous sheets was tried by an inkjet method using titania ink or carbon black ink.

Prior to inkjetting, the surface of a porous sheet was subjected to plasma treatment in a gas containing fluorine, so that the contact angle of the porous surface to water was controlled to be 50 degrees.

The surface of a porous film exhibited an appropriate lyophobic property and each ink did not excessively wet and spread, allowing good coloring.

It was confirmed that a three-dimensional structure having a desired black-and-white pattern surface was able to be manufactured by repetition of laminating a porous sheet while coloring it by an inkjet method.

In this example, while only black-and-white display was performed, it is needless to say that addition of three primary colors of RGB enables display of a wide range of colors.

While a material different from the basic skeleton material was arranged only in the vicinity of the surface of a three-dimensional structure in this example, it is effective to arrange another material in another area for the purpose of enhancing the strength of the structure.

While applications to a scaffold of an artificial organ and coloring of a three-dimensional structure have been described using examples 1 and 2, the invention is not limited to these examples and includes all three-dimensional structures having, as part thereof, a repeating structure in which another material is provided to a porous sheet and the interior of the sheet.

According to examples 1 and 2, the porous sheets 24A and 24B are piled up as the basic skeleton of a three-dimensional structure, thus enabling the basic structure composed of the basic skeleton to be built up for a relatively short time.

Also, use of a polymeric material excellent in mechanical characteristics as the material of the porous sheets 24A and 24B enables actualization of the basic skeleton and/or three-dimensional structure that, in spite of being porous, satisfies the mechanical strength.

Further, use of a biodegradable material as the material of the porous sheets 24A and 24B enables actualization of a scaffold of a three-dimensional structure for biological applications such as artificial organs.

In the case of manufacturing a scaffold for an artificial organ, appropriate arrangement of biological factors such as various cells and growth factors is enabled.

Accordingly, it is enabled to supply biological materials such as cells into the interior of a scaffold each time a porous sheet is laminated, thereby allowing immersion in a culture solution to start with a portion of the scaffold for which manufacturing has been completed.

A three-dimensional structure can be formed using a material different from the basic skeleton material, allowing new functions to be imparted.

Specifically, use of an inkjet method and the like enables materials such as metal, ceramic and polymeric materials and biological materials to be supplied, allowing various functions to be imparted to a three-dimensional structure.

What is claimed is:

1. A manufacturing method of a three-dimensional structure, comprising:
   (a) placing a second porous sheet on top of a first porous sheet that has a predetermined external shape, at least a first part of the first porous sheet containing a first functional liquid, and a second part of the first porous sheet containing a second functional liquid;
   (b) bonding the second porous sheet to the first porous sheet;
   (c) processing the second porous sheet to a predetermined shape; and
   (d) after step (b), causing a third functional liquid to be contained in at least part of the second porous sheet so that the first functional liquid and the third functional liquid are brought into contact through the first porous sheet and the second porous sheet.

2. The manufacturing method of the three-dimensional structure according to claim 1, step (d) including arranging the second functional liquid in the at least part of the second porous sheet using an inkjet method.

3. The manufacturing method of the three-dimensional structure according to claim 1, wherein each of the first porous sheet and the second porous sheet is made of a polymeric material.

4. The manufacturing method of the three-dimensional structure according to claim 1, wherein each of the first porous sheet and the second porous sheet is made of a biocompatible material.

5. The manufacturing method of the three-dimensional structure according to claim 1, wherein each of the first porous sheet and the second porous sheet is made of a biodegradable material.

6. The manufacturing method of the three-dimensional structure according to claim 5, wherein each of the first porous sheet and the second porous sheet is made of any one of polylactic acid, polyglycolic acid, a mixture thereof, a copolymer of thereof and hydrogel.

7. The manufacturing method of the three-dimensional structure according to claim 5, wherein each of the first porous sheet and the second porous sheet is made of any one of collagen, fibrin and hydroxyapatite.

8. The manufacturing method of the three-dimensional structure according to claim 1, wherein each of the first porous sheet and the second porous sheet has a porosity of 50% or more.

9. The manufacturing method of the three-dimensional structure according to claim 8, wherein each of the first porous sheet and the second porous sheet has a porosity of 80% or more.

10. The manufacturing method of the three-dimensional structure according to claim 1, wherein each of the first porous sheet and the second porous sheet has a film thickness of 50 microns or more.

11. The manufacturing method of the three-dimensional structure according to claim 10, wherein each of the first porous sheet and the second porous sheet has a film thickness of 100 microns or more and 500 microns or less.

12. The manufacturing method of the three-dimensional structure according to claim 2, step (d) including performing a surface treatment on a surface of the second porous sheet before arranging the second functional liquid using the inkjet method.

13. The manufacturing method of the three-dimensional structure according to claim 12, step (d) including one of plasma processing and ultraviolet irradiation as the surface treatment.

14. The manufacturing method of the three-dimensional structure according to claim 1, step (b) including arranging an adhesive on at least one of a surface of the first porous sheet and a surface of the second porous sheet.

15. The manufacturing method of the three-dimensional structure according to claim 14, step (b) including arranging the adhesive on the at least one of the surfaces by an inkjet method.

* * * * *